United States Patent [19]
Renius

[11] 3,808,439
[45] Apr. 30, 1974

[54] LASER ILLUMINATION THERMAL IMAGING DEVICE FOR NONDESTRUCTIVE TESTING

[75] Inventor: Otto Renius, Rochester, Mich.

[73] Assignee: The United States of America as represented by the Secretary of the Army, Washington, D.C.

[22] Filed: Apr. 24, 1972

[21] Appl. No.: 246,980

[52] U.S. Cl. .............................. 250/334, 250/341
[51] Int. Cl. .............................................. G01j 5/00
[58] Field of Search ....... 250/83.3 H, 83.3 HP, 339, 250/334, 341

[56] References Cited
UNITED STATES PATENTS

| | | | |
|---|---|---|---|
| 3,451,254 | 6/1969 | Maley | 250/339 X |
| 3,631,254 | 12/1971 | Covault | 250/339 |
| 3,315,075 | 4/1967 | Coulter et al. | 250/83.3 H |
| 3,499,153 | 3/1970 | Stanfill | 250/83.3 H |
| 3,527,533 | 9/1970 | Hook et al. | 250/83.3 HP X |
| 3,675,016 | 7/1972 | Blaisdell et al. | 250/83.3 H |

Primary Examiner—Archie R. Borchelt
Attorney, Agent, or Firm—Edward J. Kelly; Herbert Beil

[57] ABSTRACT

An apparatus and method, incorporating a scanning continuous wave laser beam, which provides a high resolution, real time nondestructive test for subsurface defects in a wide variety of materials and components.

The invention described herein may be manufactured, used, and licensed by or for the Government for govermental purposes without payment to me of any royalty thereon.

4 Claims, 2 Drawing Figures

LASER ILLUMINATION THERMAL IMAGING DEVICE FOR NONDESTRUCTIVE TESTING

BACKGROUND OF THE INVENTION

1. Field of the Invention

This invention relates to an apparatus and method for inspecting subsurface defects in a multitude of objects.

Until recently inspection of various manufactured items, to evaluate their inherent quality, had been performed by various photometric systems which have been developed to simulate with instrumentation the visual human reaction to optical defects, thus eliminating the inherent limitation of human judgment and also facilitating rapid inspection.

2. Prior Art

All the known methods and apparatus used in the inspection of objects have incorporated photometric systems, utilizing one or more beams of light and a plurality of light detecting units for receiving the beam of light after it has passed through the object that is being inspected, provided the object was translucent.

Still another method accomplished its objective by providing a radiant energy source which continuously and uniformly irradiates an area of the translucent object being inspected. A radiant energy sensitive device receives a portion of the radiant energy transmitted through the object over a prescribed area of that object. If there are defects in the irridated area, a smaller or larger portion of radiant energy will be received upon the radiant energy sensitive device during a time period when the small defective area is covered by the radiation beam. The amount of radiant energy received over a reduced time interval representative of a reduced area will be directly related to the degree and type of defects in the object.

The present state of the art has badly been in need of an efficient and reliable device for detecting defects in the subsurface of materials and components. Such imaging device for nondestructive testing is made possible through the expanded use of infrared technology.

None of the prior art devices and methods has been able to make use of laser illumination technique for nondestructive testing.

SUMMARY OF THE INVENTION

The use of infrared imaging devices for nondestructive testing has expanded rapidly due in part to advances in military infrared technology. Highly sensitive detectors and complex scanners were developed for military use. As contrasted with radiometry which presents a graphical or digital output of the detector response, a thermal imaging camera allows the construction of an image of an object which gives a visual presentation of variations in heat emitted by the area under scrutiny. Any malfunction or defect which causes a sufficiently large variation in the surface temperature of an object can be detected by infrared imagery.

Thermal imaging techniques of nondestructive testing rely on the contrast in radiation between components or sections of a component to indicate the presence of defects and malfunctions. To achieve this contrast various methods have been devised for heating the specimen in order to obtain sufficient infrared emission for thermal imagery. Most of these techniques result in excessive heating times or require close proximity between the specimen and heat source.

Infrared nondestructive testing techniques can be divided into two broad categories, active and passive. In the passive mode the entire specimen itself is the source of radiation. This source may be in a transition between two temperature levels while either heating up or cooling down to the background equilibrium. In the active method heat is selectively injected into a specimen at or near ambient temperatures. Detectable differences in heat transfer through the specimen are then used to indicate the presence of voids or defects.

A two-dimensional reflective scanner coupled to a continuous wave carbon dioxide ($CO_2$) laser to irradate the specimen and a modified three-channel infrared camera to view the specimen's irradiated surface were used to provide a high resolution realtime nondestructive test for subsurface defects.

The development of a two-dimensional long wavelength laser scanner for use in conjunction with thermal imagery expands the application of infrared nondestructive testing techniques.

All matter continuously absorbs and emits electromagnetic radiation. The continual motion of the charged particles within a material results in this emission. Since the thermal motion increases with temperature, the continuous radiation from the material also increases with temperature. The Stephan-Boltzman law states that the total energy radiated by a perfect black body is proportional to the fourth power of the absolute temperature. The ratio of the total emissive power of any body to that of a perfect black body at the same temperature is known as the emissivity and is numerically equal to the absorptivity of the body.

When radiant energy from the $CO_2$ laser falls upon the specimen, part is absorbed and part is reflected. Assuming a uniform specimen surface, the amount of total incident radiation absorbed by the specimen due to the continuously scanning laser beam is equal for the entire surface. The result is an increase in surface temperature and a flow of heat through the specimen. For a homogeneous sample, the quantity of heat that will flow by conduction per unit of time is proportional to the thermal conductivity of the material, and the irradiated surface temperature will decrease uniformly after the laser beam has passed.

If, however, voids exist in the specimen, the thermal conductivity is altered, with a resulting alteration in surface temperature in the area of non-homogeneity. This non-homogeneity can then be detected by a radiometer or thermal imaging device if it causes surface temperature variations sufficiently large to fall within the sensitivity range of the instrument.

It is an object of my invention to provide apparatus and a method which detects flaws in objects by the use of a scanning continuous wave laser beam whose wavelength is beyond the sensitivity limits of the thermal imaging camera.

It is another object of the instant invention to provide apparatus and a method which detects flaws in objects without destroying the object.

Another object of the present invention is to provide apparatus and a method for inspecting objects that establishes uniform results.

A further object of this invention is to provide a low-cost method for the rapid inspection of numerous objects.

Other objects and advantages of this invention will become apparent and the invention itself will be best understood by reference to the following description taken in conjunction with the accompanying drawings.

DESCRIPTION OF THE PREFERRED EMBODIMENT

Figure 1:
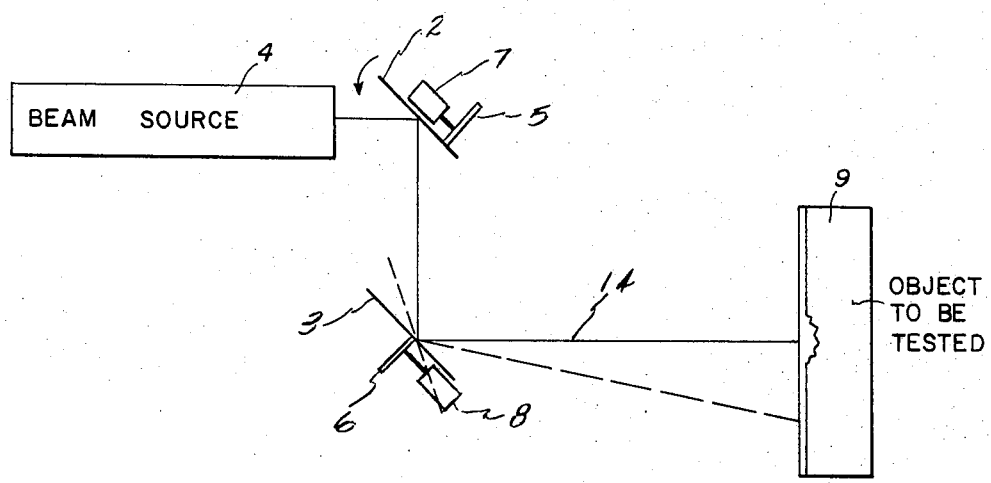
FIG. 1 is a two dimensional laser scanning system embodying the instant invention.
Figure 2:
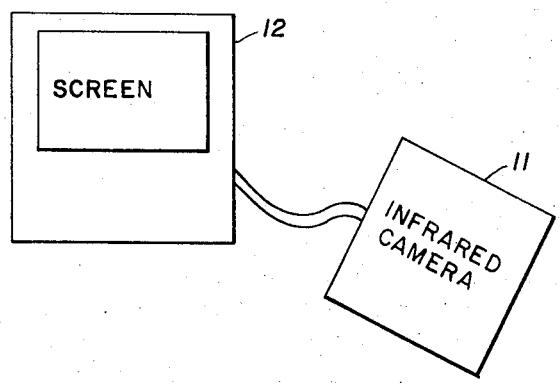
FIG. 2 is a thermal imaging camera and display unit used to read out the specimen under study.

Reflective mirrors 2 and 3 are positioned in front of laser 4 to provide the two dimensional scan. Mirrors 2 and 3 are from aluminum on pyrex, gold on pyrex, and stannous chloride on pyrex. Freshly deposited aluminum on pyrex seemed to be the preferred reflector for the laser beam 14. Cams 5 and 6 driven by motors 7 and 8 were used to achieve a two dimensional scanning pattern.

After laser beam 14 emerges from the shielded laser source 4, it strikes mirror 2 and is reflected. Mirror 2 is pivoted so that it can be tilted about a horizontal axis when driven by cam 5. The reflected beam strikes the second mirror 3 which rocks back and forth about a vertical axis thus reflecting laser beam 14 through a predetermined angle in a horizontal plane to provide a line scan. At the end of each oscillation, second mirror 3 depresses a micro-switch, not shown in the drawings, which activates cam 5 which drives first mirror 2 causing it to tilt slightly about the aforesaid horizontal axis. A two-dimensional scanning pattern is thus reflected onto the surface of an object 9 which is to be inspected for defects which are below the surface and thus are normally not visible.

Scanning devices of the type here illustrated are well-known, off-the-shelf, routinely procured catalog items. The scanning device is not my invention and I make no effort to describe it in detail, or to claim a scanning device per se.

Infrared thermal camera 11 records thermal images of the studied specimen 9 and the energy thus obtained is displayed on display screen 12. To avoid detection of unwanted radiation, the long wavelength sensitivity of the thermal imaging camera 11 does not extend to the wavelength of the emitted laser beam (10.6 microns). Photographic images can be made of display screen 12 to provide permanent records if desired.

A continuous high output $CO_2$ laser wave 4 was selected as the source because it is readily available with sufficiently high output to be useful. In addition the output (10.6 microns) cannot be detected by the thermal imaging camera 11 which has a long wavelength cutoff of 5.4 microns. The infrared camera 11 then sees only the energy re-radiated by the specimen and is "blind" to any portion of the laser beam 14 scattered by specimen 9 or other reflecting surfaces. Other laser emitting compounds may be used to achieve the desired result.

The uneven transfer of heat away from the surface of object 9 allows a thermal image of subsurface defects to be obtained as specimen 9 is scanned.

The novel concept disclosed by the present invention offers a far superior device and method over other existing means for nondestructive testing. My invention eliminates all physical coupling between the heat source and specimen 9. Laser illuminator 4 and thermal detector 11 are located on the same side of specimen 9 thus allowing complex samples to be evaluated. Scanning laser beam 14 allows high flux density radiation to be deposited in a small area of specimen 9 resulting in a real time high resolution thermal image of the subsurface defects. In addition, the scanning pattern of the laser beam 14 can be adjusted to coincide with the specimen size, thus allowing large and small specimens to be evaluated.

I wish it to be understood that further modifications may suggest themselves to those skilled in the art and I do not desire to be limited to the exact details of the description shown since various changes may be made in the invention without departing from the spirit and scope of the invention as described hereinabove, and as defined in the appended claims.

What I claim is:

1. Apparatus for nondestructive detection of subsurface defects of a tested object comprising:
   a. Means for producing a high intensity long wavelength infrared radiation beam;
   b. scanning means for moving the beam across the surface of a tested object to impart heat uniformly to the object; and
   c. heat sensing means completely insensitive to radiation of the wavelength of said beam for sensing the heat radiated by the object and producing intelligence regarding the thermal gradients of said surface; said heat sensing means comprising an infrared thermal camera for producing an image of the thermal gradients.

2. Apparatus as in claim 1 wherein the first named means comprises means for generating a continuous wave carbon dioxide laser beam.

3. Apparatus as in claim 1 wherein the thermal camera is arranged to continously view the entire surface being scanned by the beam.

4. Apparatus as in claim 1 wherein the first named means comprises means for generating a laser beam.

* * * * *